United States Patent
Teunen et al.

(10) Patent No.: US 6,233,556 B1
(45) Date of Patent: May 15, 2001

(54) VOICE PROCESSING AND VERIFICATION SYSTEM

(75) Inventors: Remco Teunen, Menlo Park; Ben Shahshahani, Capitola, both of CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/216,622

(22) Filed: Dec. 16, 1998

(51) Int. Cl.$^7$ .................................................. G10L 15/14
(52) U.S. Cl. ............................................ 704/250; 704/255
(58) Field of Search .................................... 704/200, 201, 704/231, 241, 246, 250, 270, 243, 255, 256

(56) References Cited

U.S. PATENT DOCUMENTS

| | | |
|---|---|---|
| 4,590,604 | 5/1986 | Feilchenfeld ........................... 381/42 |
| 4,887,212 | 12/1989 | Zamora et al. ....................... 364/419 |
| 4,974,191 | 11/1990 | Amirghodsi et al. ................. 364/900 |
| 5,127,055 | 6/1992 | Larkey ..................................... 381/43 |
| 5,442,780 | 8/1995 | Takanashi et al. ................... 395/600 |
| 5,528,731 | 6/1996 | Sachs et al. ......................... 395/2.55 |
| 5,603,031 | 2/1997 | White et al. .......................... 395/683 |
| 5,608,624 | 3/1997 | Luciw ................................... 395/794 |
| 5,617,486 | 4/1997 | Chow et al. .......................... 382/181 |
| 5,717,743 | 2/1998 | McMahan et al. ................... 379/188 |
| 5,794,192 | 8/1998 | Zhao ..................................... 704/244 |
| 5,842,161 | 11/1998 | Cohrs et al. ......................... 704/251 |
| 5,970,446 * | 10/1999 | Goldberg et al. .................... 704/233 |

FOREIGN PATENT DOCUMENTS 10079785    3/1998 (EP) .............................. H04M/1/57

* cited by examiner

Primary Examiner—Richemond Dorvil
(74) Attorney, Agent, or Firm—Haverstock & Owens LLP

(57) ABSTRACT

A voice processing and verification system accounts for variations dependent upon telephony equipment differences. Models are developed for the various types of telephony equipment from many users speaking on each of the types of equipment. A transformation algorithm is determined for making a transformation between each of the various types of equipment to each of the others. In other words, a model is formed for carbon button telephony equipment from many users. Similarly, a model is formed for electret telephony equipment from many users, and for cellular telephony equipment from many users. During an enrollment, a user speaks to the system. The system forms and stores a model of the user's speech. The type of telephony equipment used in the original enrollment session is also detected and stored along with the enrollment voice model. The system determines the types of telephony equipment being used based upon the spectrum of sound it receives. The telephony equipment type determination is based upon models formed for each of the telephony equipment types spoken by many different users. Thereafter, when a current user calls in, his/her voice will be compared to the stored model if the same telephony equipment as used in the enrollment is determined. If the user calls in on another type of equipment than that used during the enrollment, the transformation for telephony equipment is applied to the model. The user's voice is then verified against the transformed model. This improves the error rate resulting from different telephony equipment types.

40 Claims, 9 Drawing Sheets

[200,42,3]

[ GMM 1,1 GMM 1,2 ... GMM 1,200] ~600

[ GMM 2,1 GMM 2,2 ... GMM 2,200] ~602

[ GMM 3,1 GMM 3,2 ... GMM 3,200] ~604

[ GMM 4,1 GMM 4,2 ... GMM 4,200] ~606

VOICE PROCESSING AND VERIFICATION SYSTEM

FIELD OF THE INVENTION

This invention relates to voice processing and verification in automatic interactive telephonic systems. More specifically, the invention relates to an improved technique for telephonic voice processing and verification which may be utilized in a voice processing system while accounting for differences in transmitting telephone equipment or channels.

BACKGROUND OF THE INVENTION

A variety of tasks are necessary in speech systems. Speech recognition is the problem associated with an automated system listening to speech, regardless of the speaker and determining the words or message that is spoken. Speaker identification is the problem of listening to speech and determining which one of a group of known speakers is generating the speech. For speaker verification, the user says they are a particular person and the system determines if they are indeed that person.

For previous systems, a user entered a password using numeric processing modules and a keypad recognition system whereby a user will be able to gain access to the voice system through a string of keystrokes by selecting a string of various pre-ordained numbers, a code, on the telephonic keypad. The code length may vary, depending on the system configuration. A numeric processing module in the telephonic voice processing system is able to identify the user through such code. Each user of the telephonic voice processing system will have a separate and distinct code which can uniquely identify each user to the system individually. This type of configuration suffers from several well known drawbacks. For example, such systems are not intuitive and require a user to remember a sequence of numerical codes.

More recently, a user gained access to a system using a voice processing and verification system. FIG. 1 shows a conventional voice processing and verification system. Telephone lines 100 are coupled with one or more voice processing modules 101 which each include a voice processing server 102. Each of the voice processing modules 101 are linked to a common memory 103. An incoming telephone call is either from a new user or a current user. In some systems, if the user is new to a system, the user is prompted by the voice processing server 102 to identify that fact to the system by pushing a particular digit on the touchtone telephone keypad. This sends a newuser signal to the voice processing server 102 identifying the caller as a new user to the system. If the voice processing server 102 detects a newuser signal, the user's voice is then recorded by the voice processing server 102, converted to a digital signal, and digitally stored in memory 103. This is sometimes referred to as the enrollment process.

The enrollment process involves taking a sampling of the user's voice taken over a set interval of time. This enrollment and verification process is exemplary only; other processes may be present in the prior art. Telephonic voice processing and verification systems typically involve an enrollment process whereby a new user initially gains entry to the system by recording a model of an enrollment voice sample. This enrollment voice sample may consist of a single word but preferably is a group of words. The model of the enrollment voice sample is digitally processed and recorded in the memory 103. Models of enrollment voice samples are also stored for the other users of the system. A user is then able to gain access to the system on subsequent occasions through a comparison with each of the models of their enrollment voice sample stored in memory 103.

If the user is a current user, and not a new user to the telephonic voice processing system, the user will not enter any digits from his telephone keypad when prompted by the system. The user is first prompted by the voice processing server 102 to identify himself/herself. If known, the user's incoming voice is digitally processed by the voice processing server 102 and stored in a buffer 104. The telephonic voice verification system then compares the stored incoming voice sample with each of the enrollment voice models which are stored in memory 103. If the stored incoming voice signal matches the enrollment voice model retrieved from the memory 103, within a predetermined threshold, the user gains access to the system. If the user is not known to the system, a newuser signal is generated.

Often, in a telephonic voice verification system with multiple users, a comparison may result in a false rejection or false acceptance. A false rejection occurs when the user is denied access to the system when they should be granted access. A false acceptance occurs when the user is allowed access when it should be denied. One common reason for false rejection and false acceptance is caused by variations in the stored incoming voice signal which are attributable to noise and/or signal variations caused by differing telephonic equipment. For example, an enrollment voice model recorded from an initial incoming telephone call made over a carbon button telephone is likely to significantly differ from a subsequent incoming voice signal where the incoming voice signal is from a cellular telephone or an electret telephone.

Common telephone types include carbon button, cellular and electret. Each of these types of telephones introduces a different type of noise or other signal modification. It is well known that users sound different over these different types of telephony equipment. A person receiving a call from another person they know well will recognize differences in the sound of the caller's voice when made from different types of equipment. Such changes to the received signal can cause an automated system to reject a known user. For example, consider a user that provides the enrollment voice sample from a carbon button type phone at their desk. If the same user calls back later from a cellular phone, the user might be rejected because of variances introduced by the equipment differences. This problem could be overcome by changing the threshold levels required for a match in verification; however, such a course of action would lead to increased occurrences of false acceptances. Therefore, what is needed is an improved voice processing and verification system which can account for these variations.

SUMMARY OF THE INVENTION

The invention is a voice processing and verification system which accounts for variations dependent upon telephony equipment differences. Models are developed for the various types of telephony equipment from many users speaking on each of the types of equipment. A transformation algorithm is determined for making a transformation between each of the various types of equipment to each of the others. In other words, a model is formed for carbon button telephony equipment from many users. Similarly, a model is formed for electret telephony equipment from many users, and for cellular telephony equipment from many users. Models can also be formed for any other type of equipment, such as telephone headsets, personal computer microphones and the like.

During an enrollment, a user speaks to the system. The system forms and stores a model of the user's speech. The type of telephony equipment used in the original enrollment session is also detected and stored along with the enrollment voice model. The system determines the types of telephony equipment being, used based upon the spectrum of sound it receives. The telephony equipment type determination is based upon models formed for each of the telephony equipment types spoken by many different users.

Thereafter, when a current user calls in, his/her voice will be compared to the stored model if the same telephony equipment as used in the enrollment is determined. If the user calls in on another type of equipment than that used during the enrollment, the transformation for telephony equipment is applied to the model. The user's voice is then verified against the transformed model. This improves the error rate resulting from different telephony equipment types.

DETAILED DESCRIPTION OF THE PREFERRED EMBODIMENT

Figure 1:
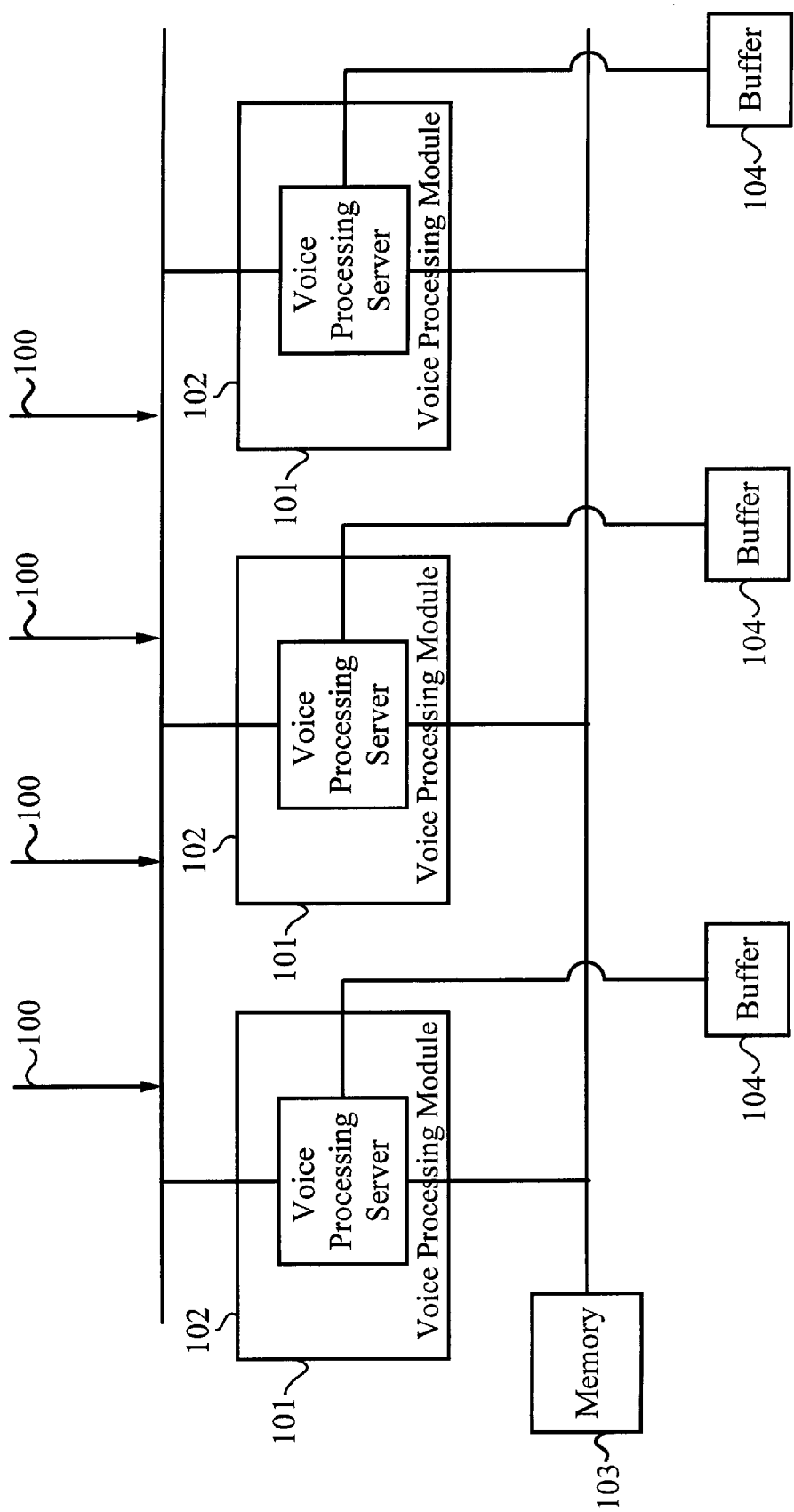
FIG. 1 shows a conventional voice processing and verification system.
Figures 2, 3:
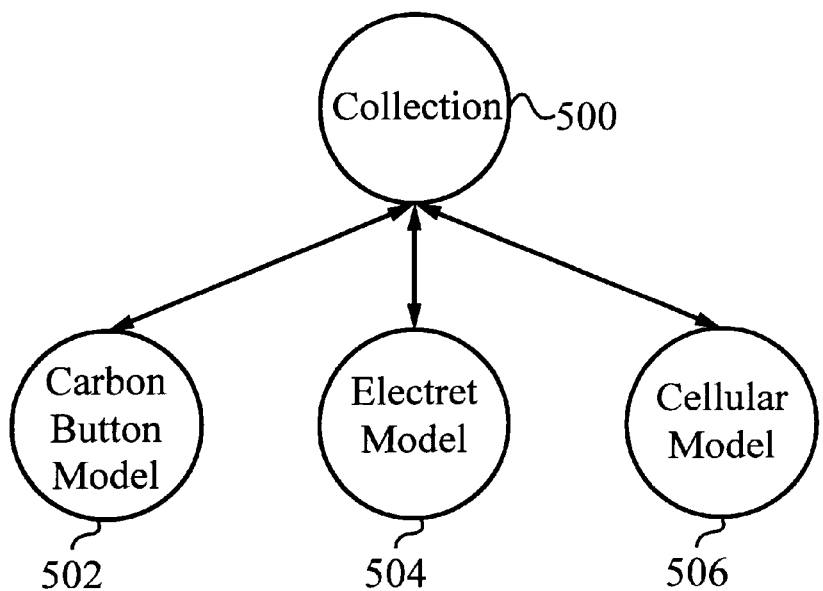
FIG. 2 shows a schematic representation of the telephony equipment type models.
FIG. 3 shows a schematic representation of the several gaussians of each model.

FIG. 2 shows a schematic representation of the telephony equipment type models. Voice samples are taken from many users using the several types of commercially available telephony equipment. According to the preferred embodiment, three types of such equipment are considered including carbon button, electret and cellular. This in no way is intended to limit the scope of the invention and other types of equipment now known or hereafter developed can be adapted to the teachings herein. A collection 500 of gaussians are developed for all the data taken. The preferred embodiment uses gaussian mixture models. However, other statistical modelling can also be used to achieve the benefits of the present invention. This collection 500 represents and incorporates data for carbon button, electret and cellular telephony equipment and also for all types of speakers. In addition, three separate models are formed. The models 502, 504 and 506 are formed by adapting the gaussian mixture model 500 with the corresponding data. A carbon button model 502 is a model for all data taken from callers using carbon button telephony equipment. An electret model 504 is a model for all data taken from callers using electret telephony equipment. A cellular model 506 is a model for all data taken from callers using cellular telephony equipment. These models are all speaker independent models so that they better represent the equipment.

Each of the models 500, 502, 504 and 506 is represented by a multi-dimensional gaussian mixture model, each gaussian representing a portion of the acoustic space, for example a particular sound. In the preferred embodiment, there are 200 gaussians for each model. This number of gaussians is selected as a matter of convenience for providing a particular speed, data storage, error rate and the like. Other numbers of gaussians can be selected dependent upon the desired system performance requirements. Each of the gaussians has 42 dimensions. Each dimension as two coefficients indicating its mean and variance. Each gaussian has a weight associated to it. Other numbers of dimensions can be selected dependent upon the desired system performance requirements.

Thus, each model has its appropriate gaussian for each portion of the acoustic space. FIG. 3 shows the gaussian mixture models 600, 602, 604 and 606, respectively for the models 500, 502, 504 and 506 of FIG. 2. Because the gaussians are related for the particular sounds in the acoustic space, there are corresponding gaussians in each of the models 500, 502, 504 and 506. A transformation of mean, variance and weight is determined for converting the various corresponding gaussians from the model for one telephony equipment type to another. For example, a transformation is determined for converting the gaussian $GMM_{2,1}$ (for carbon button) to the gaussian $GMM_{3,1}$ (for electret) and a transformation is determined for converting the gaussian $GMM_{2,1}$ (for carbon button) to the gaussian $GMM_{4,1}$ (for cellular). The reverse transformations are also determined. Thus, for the three corresponding gaussians $GMM_{2,1}$, $GMM_{3,1}$ and $GMM_{4,1}$ there are six possible known transformations based upon the data, from each one of the gaussians to the other two. These transformations are determined for each of the 200 gaussians for each model.

Figure 4:
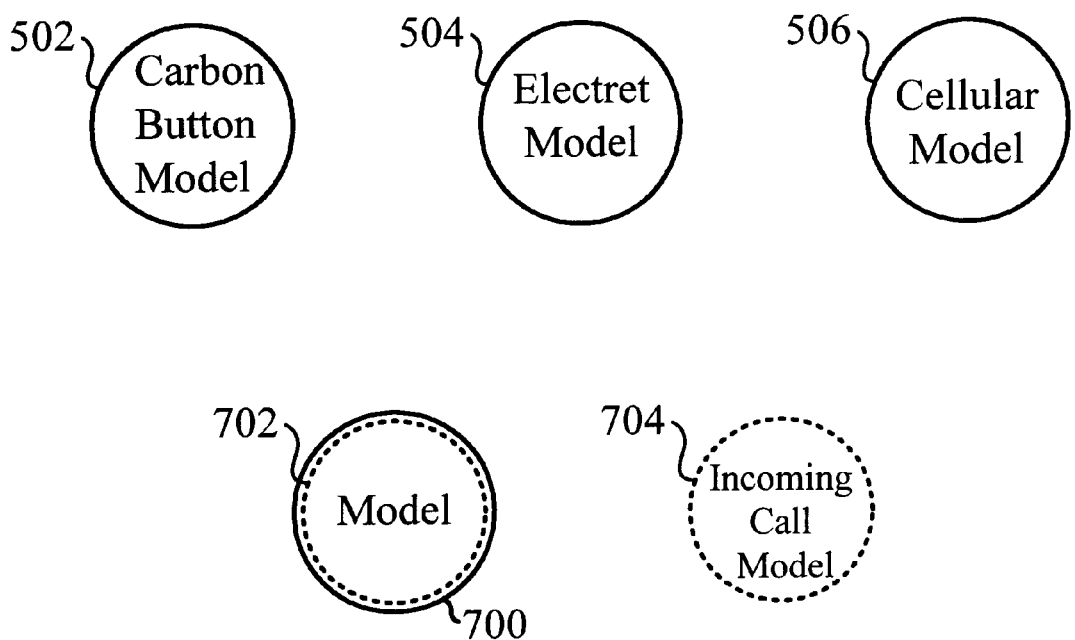
FIG. 4 shows a schematic representation of a model taken for verification.

A system is provided which stores the models discussed above for carbon button telephones 502, electret telephones 504 and cellular telephones 506 as shown in FIG. 4. When a new user enrolls on the system, they will provide speech during an enrollment process. Their speech is modelled and stored. For example, a new user George Washington provides enrollment speech from an electret telephone and a model 700 for this electret data is stored.

Later when this user calls into the system, they will announce themselves, for example "This is George Washington." The system will record the speech and compare it to the general models 502, 504 and 506 to determine the type of equipment being used. If the user called in on an electret telephone, the system determines that an electret telephone was used and will compare the speech for the incoming call 702 to the model 700 stored for the electret telephone enrollment. Mr. Washington will be verified and allowed access to the system to carry on his business. If on the other hand, the user called in on a cellular telephone, the system will determine that a cellular telephone was used. The system will provide the known transformations for each of the gaussians of the enrollment model to convert the enrollment model from electret to cellular to verify the caller. In the alternative, the system could form a model of an incoming call and provide the known transformations for each of the gaussians of the incoming call model 704 to convert the model for the incoming call from cellular to electret to verify the caller. In the preferred embodiment, the incoming speech is compared to the model of the enrollment speech. It is possible that the incoming speech could be modelled and the model of the incoming speech could be compared to the enrollment model in the way described above. Similarly, the enrollment speech could be stored and it could be compared to the model of the incoming speech or converted to a model when needed.

Figure 5:
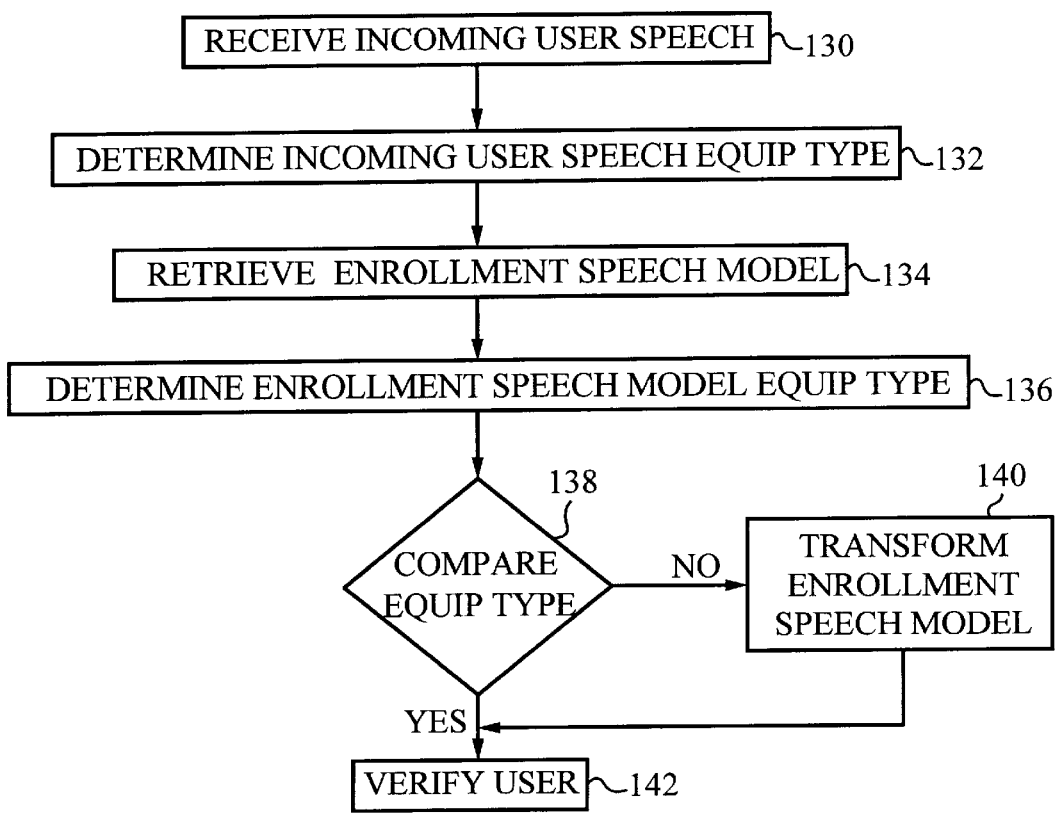
FIG. 5 shows a flowchart for comparing an incoming user speech and a retrieved enrollment speech model.

FIGS. 5–8 show flowcharts of four embodiments of the process alternatives discussed above. In FIG. 5, an incoming user speech us received at step 130. At step 132, the particular type of equipment corresponding to the incoming user speech is determined. A stored enrollment speech model is retrieved at step 134 and the particular type of equipment corresponding to the enrollment speech model is determined at step 136. At step 138, it is determined if the equipment type corresponding to the enrollment speech model is the same as the equipment type corresponding to the incoming user speech. If the equipment types are not the same, then at step 140 the system will provide the known transformations for each of the gaussians of the enrollment speech model to convert the enrollment speech model corresponding to its current equipment type to the enrollment speech model corresponding to the equipment type for the incoming user speech. If the equipment types are the same, as determined at step 138, or after the enrollment speech model has been transformed at step 140, then the incoming user speech is compared to the enrollment speech model to verify the user at step 142.

Figure 6:
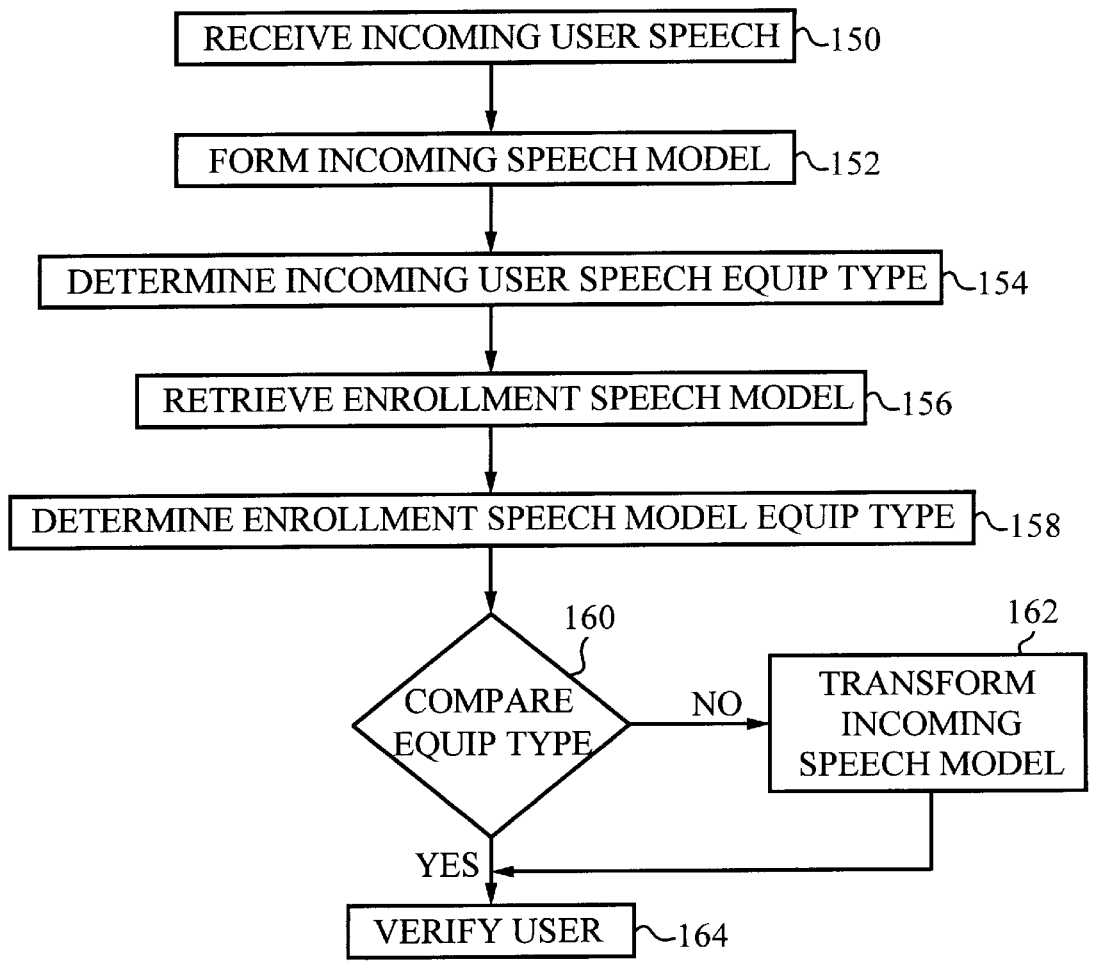
FIG. 6 shows a flowchart for comparing an incoming user speech and a retrieved enrollment speech model.

FIG. 6, an incoming user speech is received at step 150 and the incoming user speech is formed into an incoming speech model at step 152. At step 154, the particular type of equipment corresponding to the incoming user speech is determined. A stored enrollment speech model is retrieved at step 156 and the particular type of equipment corresponding to the enrollment speech model is determined at step 158. At step 160, it is determined if the equipment type corresponding to the enrollment speech model is the same at the equipment type corresponding to the incoming user speech. If the equipment types are not the same, then at step 162 the system will provide the known transformations for each of the gaussians of the incoming speech model to convert the incoming speech model corresponding to the current equipment type for the incoming user speech to the incoming speech model corresponding to the equipment type for the enrollment speech model. If the equipment types are the same, as determined at step 160, or after the incoming speech model has been transformed at step 162, then the incoming speech model is compared to the enrollment speech model to verify the incoming user at step 164.

Figure 7:
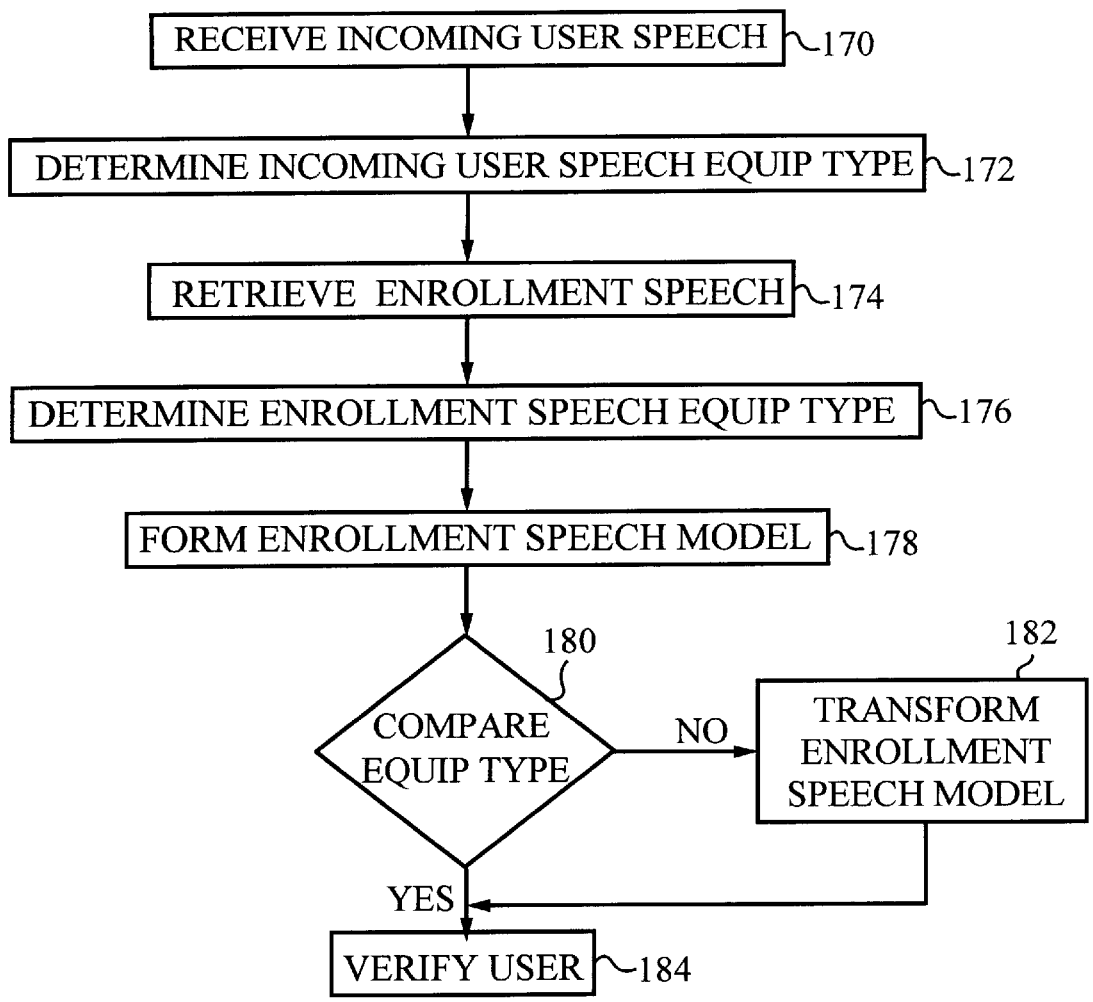
FIG. 7 shows a flowchart for comparing an incoming user speech and a retrieved enrollment speech model.

In FIG. 7, an incoming user speech is received at step 170. At step 172, the particular type of equipment corresponding to the incoming user speech is determined. A stored enrollment speech is retrieved at step 174, the particular type of equipment corresponding to the enrollment speech is determined at step 176, and the enrollment speech is formed into an enrollment speech model at step 178. At step 180, it is determined if the equipment type corresponding to the enrollment speech is the same as the equipment type corresponding to the incoming user speech. If the equipment types are not the same, then at step 182 the system will provide the known transformations for each of the gaussians of the enrollment speech model to convert the enrollment speech model corresponding to the current equipment type for the enrollment speech to the enrollment speech model corresponding to the equipment type for the incoming user speech. If the equipment types are the same, as determined at step 180, or after the enrollment speech model has been transformed at step 182, then the incoming user speech is compared to the enrollment speech model to verify the incoming user at step 184.

Figure 8:
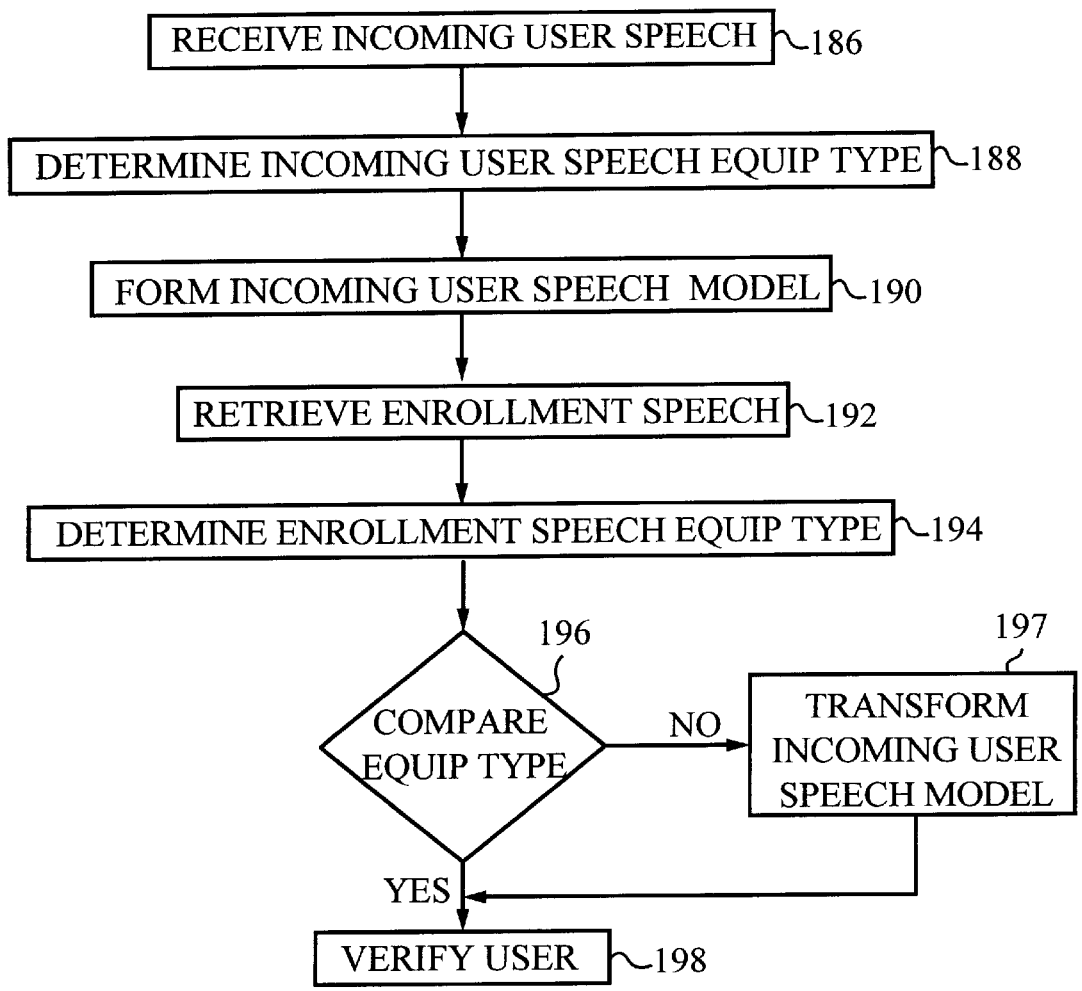
FIG. 8 shows a flowchart for comparing an incoming user speech and a retrieved enrollment speech model.

In FIG. 8, an incoming user speech is received at step 186. At step 188, the particular type of equipment corresponding to the incoming user speech is determined. The incoming user speech is formed into an incoming user speech model at step 190. A stored enrollment speech is retrieved at step 192 and the particular type of equipment corresponding to the enrollment speech is determined at step 194. At step 196, it is determined if the equipment type corresponding to the enrollment speech is the same as the equipment type corresponding to the incoming user speech. If the equipment types are not the same, then at step 197, the system will provide the known transformations for each of the gaussians of the incoming user speech model to convert the incoming user speech model corresponding to the current equipment type for the incoming user speech to the incoming user speech model corresponding to the equipment type for the enrollment speech. If the equipment types are the same, as determined at step 196, or after the incoming user speech model has been transformed at step 197, then the incoming user speech model is compared to the enrollment speech to verify the incoming user at step 198.

Figure 9:
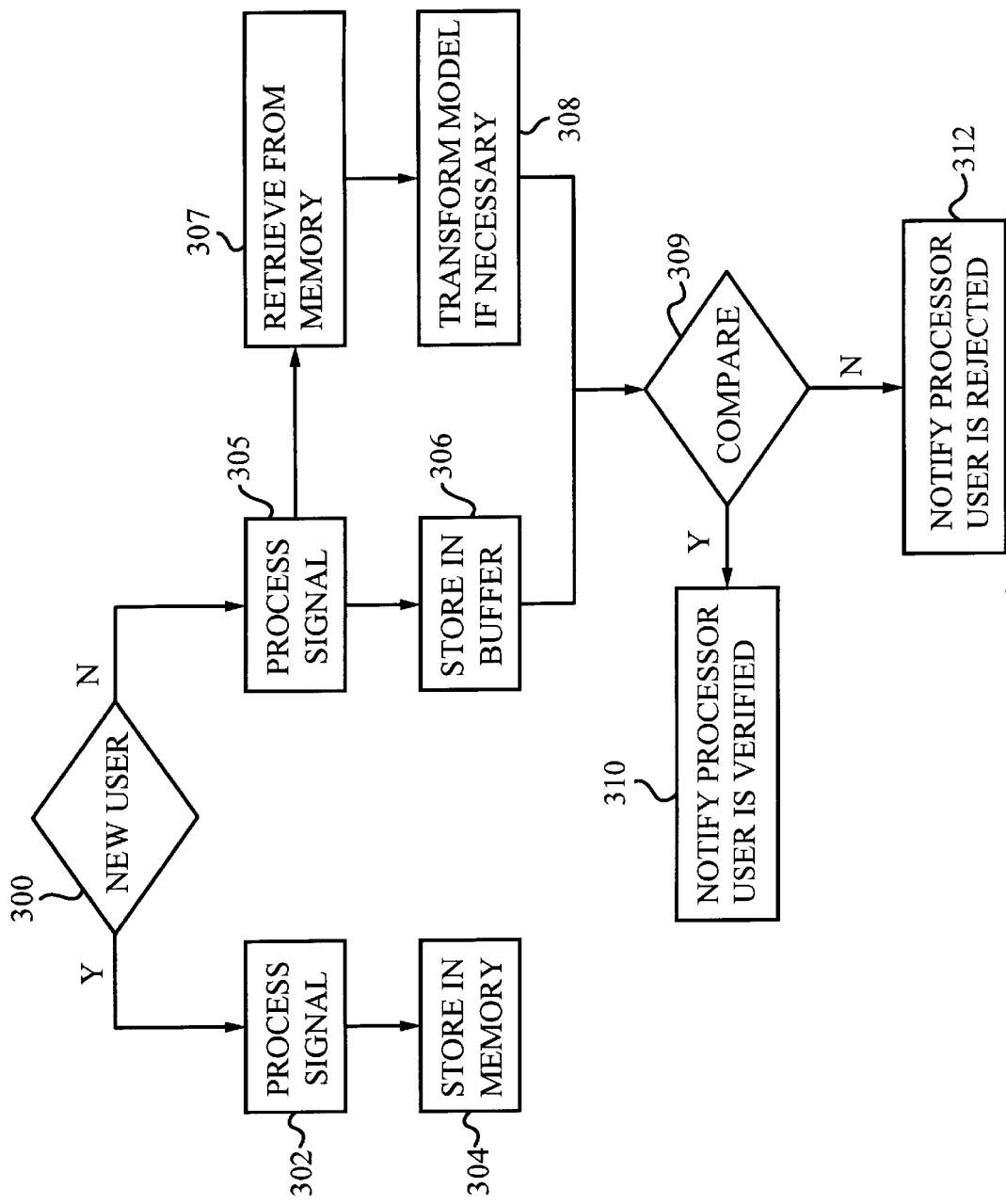
FIG. 9 shows a flowchart for the preferred method of improved telephone voice processing and verification in FIG. 10 shows a block diagram of the preferred embodiment of the present invention.

Referring now to FIG. 9, the voice processing and verification system of the present invention receives an incoming telephone call and first determines whether the telephone call is from a new user (Step 300). If the telephone call is from a new user, then a model of the enrollment voice sample is recorded (Step 302), digitally processed and stored in memory (Step 304). In Step 304 the digital processing includes identifying the type of equipment used in recording the enrollment voice sample model. This information is also stored in memory along with the digitally processed enrollment voice sample model.

In Step 300, if the telephone call is not from a new user, then the system will record the incoming telephone signal (Step 305), digitally process the signal and store the signal in a buffer (Step 306). In Step 306, the digital processing includes identifying the type of equipment used in recording the incoming telephone signal. As shown in Step 307, after the incoming telephone signal has been recorded, digitally processed and stored in the buffer, the system then begins transferring the appropriate enrollment voice sample model.

The voice signal modulator receives the enrollment voice sample model and generates a transformation of the enrollment voice model (Step 308), if necessary, to match another equipment type. This is done by first identifying the type of equipment used in recording the enrollment voice model. If a different type of telephony equipment is identified, the system then applies the appropriate set of transformations to the enrollment voice model, such that the resulting model is as if it was actually recorded from another type of telephony equipment.

In Step 309, the model or the transformed model is then compared to the incoming voice sample stored in the buffer. If either the model or the transformed model matches the voice sample stored in the buffer, within certain thresholds, then the system verifies the user (Step 310). A failure to verify is also indicated to the system (Step 312).

Figure 10:
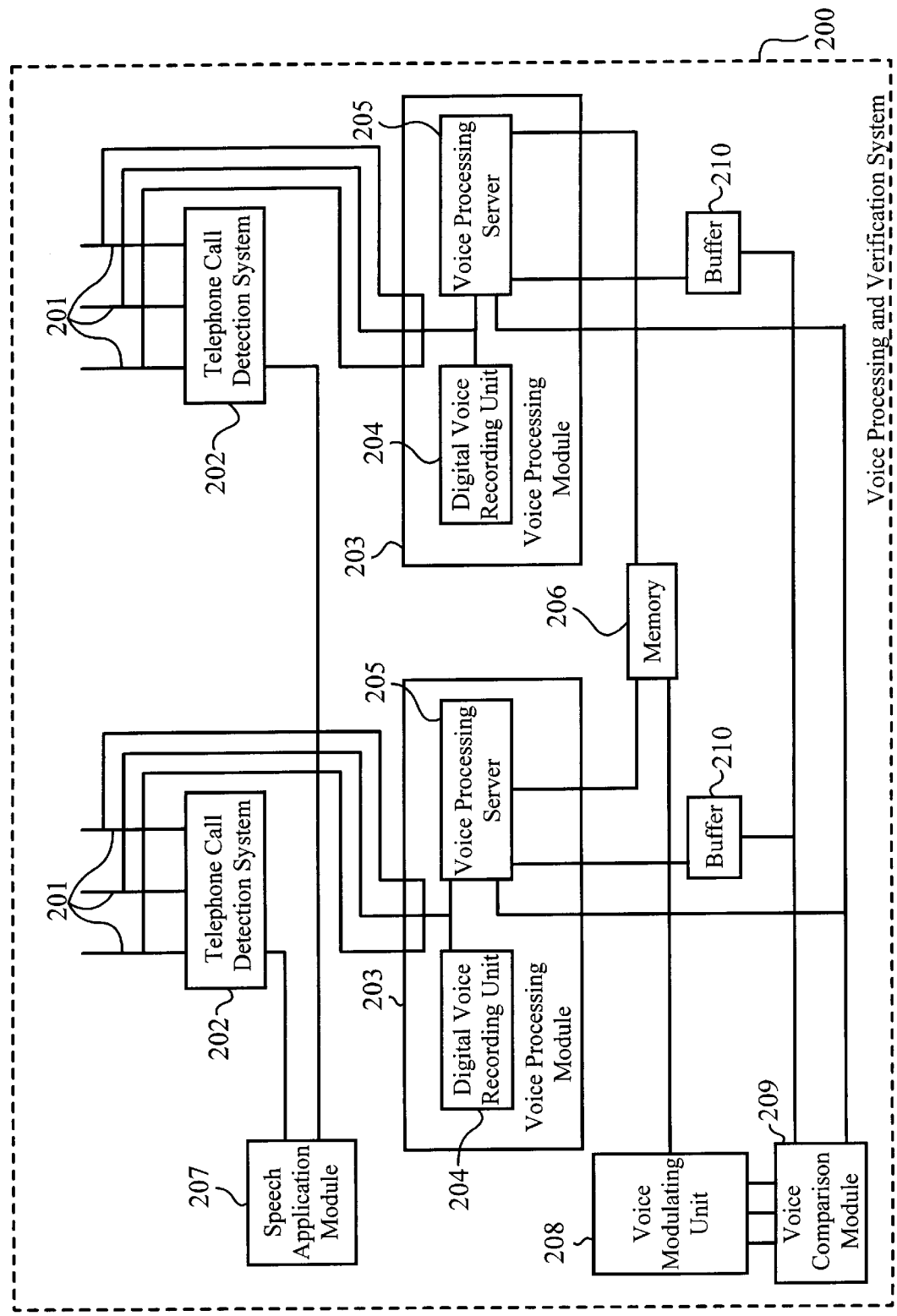

FIG. 10 shows a block diagram of the preferred embodiment of the voice processing and verification system 200 of the present invention. The voice processing and verification system 200 of the present invention is adapted for use in a telephonic voice processing system and is designed to handle a number of users over various types of telephony equipment. It will be apparent to one of ordinarily skill in the art that the voice processing and verification system of the present invention my be adapted for use in other types of voice verification systems.

In FIG. 10, one or more telephone lines 201 are coupled to provide multiple users with access to the voice processing and verification system 200 of the present invention. The telephone lines 201 are coupled to several telephone call detection systems 202 and voice processing modules 203. The telephone call detection systems 202 are adapted to determine when a call begins and when a call ends. A speech application module 207 is coupled to each telephone call detection system 202.

Each of the voice processing modules 203 has a digital voice recording unit 204 which is coupled to the phone lines 201 and a voice processing server 205 through a common bus. Each voice processing server 205 is linked to a common memory 206 and a buffer 210. The common memory 206 is designed for storing the enrollment voice samples for all of the users to the system; while the buffer 210 is used to store incoming voice signals of current system users.

A voice modulating unit 208 is also coupled to the common memory 206. The voice modulating unit 208 is designed to retrieve the appropriate enrollment voice model from the memory 206 when a current user calls into the system. The voice modulating unit 208 generates a transformation for the enrollment voice model retrieved from the memory 206, if appropriate.

A voice comparison module 209 is coupled to the voice modulating unit 208 and the buffer 210. As the enrollment voice model is retrieved from the memory 206, the voice comparison module 209 compares the transformation generated by the voice modulating unit 208 with the incoming voice sample stored in the buffer 210.

The present invention has been described in terms of a specific embodiment utilized in a voice processing system, incorporating details of such voice processing system when necessary in order to facilitate the understanding of the principles of construction and operation of the invention, such reference herein to specific embodiments and details thereof is not intended to limit the scope of the claims appended hereto. It will be apparent to those skilled in the art that modifications may be made in the embodiments chosen for illustration without departing from the spirit and scope of the invention. For example, the description has been focused on generating transformations of the enrollment voice model; however, it is equally possible to generate transformations of the incoming voice signal and compare these transformations with the enrollment voice model.

What is claimed is:

1. A method of voice processing to verify a user comprising the steps of:
   a. receiving an incoming user speech;
   b. determining the particular type of equipment corresponding to the incoming user speech;
   c. retrieving an enrollment speech model;
   d. determining the particular type of equipment corresponding to the enrollment speech model; and
   e. transforming the enrollment speech model to a corresponding equipment type for the incoming user speech.

2. The method of voice processing to verify a user according to claim 1 further comprising the step of generating a plurality of speaker independent models each speaker independent model representing a particular type of equipment, such that the plurality of speaker independent models are used in the step of transforming.

3. The method of voice processing to verify a user according to claim 1 further comprising the step of comparing the incoming user speech to the transformed speech model to verify the user.

4. The method of voice processing to verify a user according to claim 1 wherein the model is a gaussian mixture model.

5. A method of voice processing to verify a user comprising the steps of:
   a. receiving an incoming user speech and forming a model thereof to form an incoming speech model;
   b. determining the particular type of equipment corresponding to the incoming user speech;
   c. retrieving an enrollment speech model;
   d. determining the particular type of equipment corresponding to the enrollment speech model; and
   e. transforming the incoming speech model to a corresponding equipment type for the enrollment speech model.

6. The method of voice processing to verify a user according to claim 5 further comprising the step of generating a plurality of speaker independent models each speaker independent model representing a particular type of equipment, such that the plurality of speaker independent models are used in the step of transforming.

7. The method of voice processing to verify a user according to claim 5 further comprising the step of comparing the incoming speech model to the transformed speech model to verify the user.

8. The method of voice processing to verify a user according to claim 5 wherein the models are gaussian mixture models.

9. A method of voice processing to verify a user comprising the steps of:
   a. receiving an incoming user speech;
   b. determining the particular type of equipment corresponding to the incoming user speech;
   c. retrieving an enrollment speech sample;
   d. determining the particular type of equipment corresponding to the enrollment speech sample;
   e. forming a model from the enrollment speech sample to form an enrollment speech model; and
   f. transforming the enrollment speech model to a corresponding equipment type for the incoming user speech.

10. The method of voice processing to verify a user according to claim 9 further comprising the step of generating a plurality of speaker independent models each speaker independent model representing a particular type of equipment, such that the plurality of speaker independent models are used in the step of transforming.

11. The method of voice processing to verify a user according to claim 9 further comprising the step of comparing the incoming user speech to the transformed enrollment speech model to verify the user.

12. The method of voice processing to verify a user according to claim 9 wherein the model is a gaussian mixture model.

13. A method of voice processing to verify a user comprising the steps of:
   a. receiving an incoming user speech;
   b. determining the particular type of equipment corresponding to the incoming user speech;
   c. forming a model from the incoming user speech to form an incoming user speech model;
   d. retrieving an enrollment speech sample;

e. determining the particular type of equipment corresponding to the enrollment speech sample; and
f. transforming the incoming user speech model to a corresponding equipment type for the enrollment speech sample.

14. The method of voice processing to verify a user according to claim 13 further comprising the step of generating a plurality of speaker independent models each speaker independent model representing a particular type of equipment, such that the plurality of speaker independent models are used in the step of transforming.

15. The method of voice processing to verify a user according to claim 13 further comprising the step of comparing the transformed incoming user speech model to the enrollment speech sample to verify the user.

16. The method of voice processing to verify a user according to claim 13 wherein the model is a gaussian mixture model.

17. A method of voice processing to identify a user comprising the steps of:
   a. receiving an incoming voice sample;
   b. digitally processing the incoming voice sample thereby creating a digitally processed voice sample;
   c. storing the digitally processed voice sample in a buffer;
   d. retrieving an enrollment voice sample and generating a model of the enrollment voice sample;
   e. comparing the model of the enrollment voice sample to the digitally processed voice sample, in order to determine a match within a certain tolerance.

18. The method of voice processing and verification, as in claim 17, wherein the step of receiving an incoming voice sample is done by recording an incoming user voice signal over a fixed period of time.

19. The method of voice processing and verification, as in claim 17, wherein the enrollment sample is recorded, digitally processed and stored in a memory device before receiving the incoming voice sample.

20. The method of voice processing and verification, as in claim 19, wherein the model of the enrollment sample is formed before receiving the incoming voice sample.

21. The method of voice processing and verification, as recited in claim 19, further comprising the step of identifying the type of equipment used in recording the enrollment sample and storing this information in the memory device.

22. The method of voice processing and verification, as recited in claim 17, wherein the plurality of models of the enrollment voice sample are generated by impressing transformations on the enrollment voice sample.

23. The method of voice processing and verification, as in claim 22, wherein the transformations impressed on the enrollment voice sample represent differences attributable to alternate recording equipment.

24. The method of voice processing and verification, as recited in claim 22, wherein the transformations are programmable.

25. A method of voice processing to verify a user comprising the steps of:
   a. receiving an enrollment voice sample;
   b. digitally processing the enrollment voice sample thereby creating a digitally processed enrollment sample;
   c. storing the digitally processed enrollment sample in a memory device;
   d. retrieving an incoming voice signal and generating a plurality of signal models of said incoming voice signal;
   e. comparing each of the signal models of the incoming voice signal to the digitally processed enrollment sample to determine a match within a certain system tolerance.

26. The method of voice processing to verify a user, as in claim 25, wherein the step of generating a plurality of signal models of said incoming voice signal is accomplished by impressing transformations on the incoming voice signal.

27. The method of voice processing to verify a user, as in claim 26, wherein the transformations impressed on the incoming voice signal represent differences attributable to alternate recording equipment.

28. The method of voice processing to verify a user, as recited in claim 26, wherein the transformations are programmable.

29. A computer apparatus for telephonic voice processing and verification, designed to minimize false rejection or false acceptance, consisting of:
   a. means for receiving a telephonic voice sample over a fixed period of time;
   b. means for digitally processing the telephonic voice sample;
   c. means for storing the digitally processed telephonic voice sample; and
   d. means for retrieving the digitally processed voice sample and generating a plurality of models of the digitally processed voice sample; and
   e. means for comparing the plurality of models of the digitally processed voice sample with an enrollment signal, in order to determine a match within certain known variable tolerances.

30. The computer apparatus for telephonic voice processing and verification, as in claim 29, further comprising:
   a. means for recording an enrollment signal;
   b. means for digitally processing the enrollment signal; and
   c. means for storing the enrollment signal in a memory device.

31. The computer apparatus for telephonic voice processing and verification, as in claim 30, further comprising a means for identifying the type of telephony equipment used in recording the enrollment signal.

32. The computer apparatus for telephonic voice processing and verification, as in claim 29, wherein the certain variable tolerances are programmable.

33. A computer apparatus for voice processing and verification, designed to minimize false rejection or false acceptance, comprising:
   a. means for receiving an enrollment voice sample;
   b. means for digitally processing the enrollment voice sample thereby creating a digitally processed enrollment sample;
   c. means for storing the digitally processed enrollment sample;
   d. means for retrieving the digitally processed enrollment sample and generating a plurality of signal models of said digitally processed enrollment sample; and
   e. means for comparing each of the signal models of the digitally processed enrollment sample to an incoming voice sample to determine a match within a certain system tolerance.

34. The computer apparatus for voice processing and verification, as in claim 33, wherein the means for generating a plurality of signal models of said digitally processed enrollment sample includes a means for impressing transformations on the digitally processed enrollment sample.

35. The computer apparatus for voice processing and verification, as in claim 34, wherein the transformations impressed on the digitally processed enrollment sample represent differences attributable to alternate recording equipment.

36. The computer apparatus for voice processing and verification, as recited in claim 35, wherein the transformations are programmable.

37. A voice processing and verification system for verifying a user comprising:
  a. one or more telephone lines coupled to a telephone call detection system;
  b. a voice processing module coupled to the telephone lines wherein the voice processing module includes a digital voice recording unit for recording incoming telephone calls from both new users and current users to the system, and a voice processing server for digitally processing these recordings;
  c. a common memory coupled to the voice processing module for storing the digitally processed recording of a new user to the system, known as an enrollment sample;
  d. a buffer for storing the digitally processed recording of a current user to the system;
  e. a voice modulating unit coupled to the common memory for retrieving the enrollment sample and generating a plurality of various models of the enrollment sample, as if the enrollment sample were originally recorded over various types of telephony equipment; and
  f. a voice comparison module for comparing each of the plurality of various models of the enrollment sample with the digitally processed recordings of a current user to the system stored in the buffer in order to determine a match within a certain threshold.

38. The voice processing and verification system, as in claim 37, wherein the voice modulating unit generates the plurality of signal models of said enrollment sample by impressing transformations on the enrollment sample.

39. The voice processing and verification system, as in claim 38, wherein the transformations impressed on the enrollment sample represent differences attributable to alternate recording equipment.

40. The voice processing and verification system, as recited in claim 39, wherein the transformations are programmable.

\* \* \* \* \*

UNITED STATES PATENT AND TRADEMARK OFFICE
CERTIFICATE OF CORRECTION

PATENT NO. : 6,233,556 B1
DATED : May 15, 2001
INVENTOR(S) : Teunen et al.

Page 1 of 1

It is certified that error appears in the above-identified patent and that said Letters Patent is hereby corrected as shown below:

Column 3,
Line 6, between "being" and "used" delete ",".
Line 33, delete the last word "user".
Line 34, after the first word "speech" add -- model --.
Line 36, delete the last word "model".
Line 38, after the first word "speech" add -- model --.
Line 38, delete the last word "model".
Line 40, after "verification in" add -- the present invention --.

Column 5,
Line 9, between "user speech" and "received at" delete "us" and add -- is --.
Line 36, after "the same" delete "at" and add -- as --.

Signed and Sealed this

Thirteenth Day of November, 2001

*Attest:*

*Attesting Officer*

NICHOLAS P. GODICI
*Acting Director of the United States Patent and Trademark Office*